United States Patent
Brochot et al.

(10) Patent No.: US 10,513,059 B2
(45) Date of Patent: Dec. 24, 2019

(54) METHOD FOR MANUFACTURING A TOOTHED WHEEL WITH A RIBBED CAST RIM

(71) Applicant: JTEKT EUROPE, Irigny (FR)

(72) Inventors: Patrice Brochot, Oullins (FR); Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 353 days.

(21) Appl. No.: 15/313,602

(22) PCT Filed: Jun. 4, 2015

(86) PCT No.: PCT/FR2015/051481
§ 371 (c)(1),
(2) Date: Nov. 23, 2016

(87) PCT Pub. No.: WO2015/189502
PCT Pub. Date: Dec. 17, 2015

(65) Prior Publication Data
US 2017/0095950 A1   Apr. 6, 2017

(30) Foreign Application Priority Data

Jun. 11, 2014   (FR) ...................................... 14 55300

(51) Int. Cl.
*B29C 45/14* (2006.01)
*B29C 37/00* (2006.01)
(Continued)

(52) U.S. Cl.
CPC ........ *B29C 37/0082* (2013.01); *B29C 39/006* (2013.01); *B29C 45/1459* (2013.01);
(Continued)

(58) Field of Classification Search
None
See application file for complete search history.

(56) References Cited

U.S. PATENT DOCUMENTS

| 3,114,598 | A | | 12/1963 | Beckadolph et al. |
| 4,497,766 | A | * | 2/1985 | Olsson ...................... B60B 5/02 264/328.8 |

(Continued)

FOREIGN PATENT DOCUMENTS

| DE | 101 27 224 A1 | 12/2002 |
| DE | 10 2012 102775 A1 | 10/2013 |

(Continued)

OTHER PUBLICATIONS

Jul. 30, 2015 Search Report issued in International Patent Application No. PCT/FR2015/051481.

*Primary Examiner* — Monica A Huson
*Assistant Examiner* — Kelsey C Grace
(74) *Attorney, Agent, or Firm* — Oliff PLC

(57) ABSTRACT

A method for manufacturing a wheel including a step (a) during which a liquid to be polymerised is cast into a first mould so as to solidify same into a tubular preform, with main axis, the first mould including modelling cores in order to form recesses, of the rib type, in the radial thickness of the tubular preform; followed by a cutting step (b), during which the tubular preform is cut perpendicular to the main axis thereof, and secant to the recesses, so as to obtain a tubular preform section forming a rim; followed by an overmoulding step (d), during which said rim is placed in a second mould, concentrically with a central supporting member, such as a bushing or a shaft, and a polymer filling material is injected so as to create an intermediate disc that provides the attachment of the rim to the central supporting member.

8 Claims, 2 Drawing Sheets

(51) Int. Cl.
*B29C 39/00* (2006.01)
*F16H 55/06* (2006.01)
*B29L 15/00* (2006.01)
*B29K 77/00* (2006.01)
*B62D 5/00* (2006.01)

(52) U.S. Cl.
CPC .. *B29C 45/14065* (2013.01); *B29C 45/14221* (2013.01); *B29K 2077/00* (2013.01); *B29L 2015/00* (2013.01); *B62D 5/008* (2013.01); *F16H 2055/065* (2013.01)

(56) References Cited

U.S. PATENT DOCUMENTS

| | | | |
|---|---|---|---|
| 5,722,295 A * | 3/1998 | Sakai | F16H 55/06 264/101 |
| 2004/0198499 A1 * | 10/2004 | Kamdem | F16D 3/58 464/75 |
| 2006/0027294 A1 | 2/2006 | Tabor et al. | |
| 2007/0214642 A1 * | 9/2007 | Meijer | B21D 53/28 29/893.31 |

FOREIGN PATENT DOCUMENTS

| | | |
|---|---|---|
| GB | 1 113 945 A | 5/1968 |
| JP | 2004-204902 A | 7/2004 |

\* cited by examiner

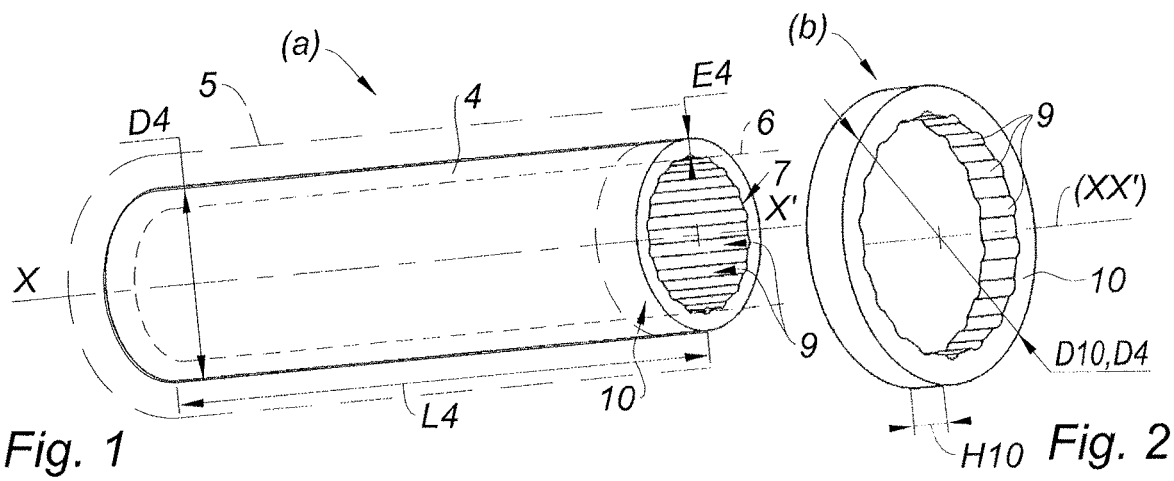
Fig. 1
Fig. 2
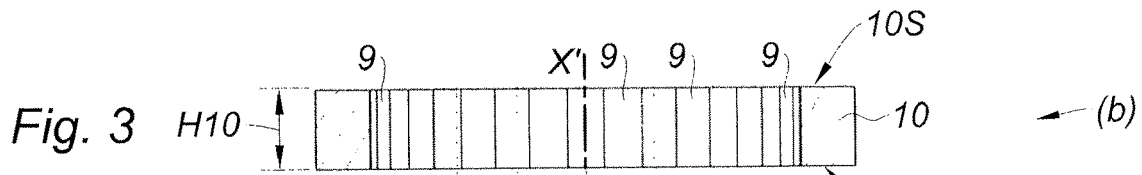
Fig. 3
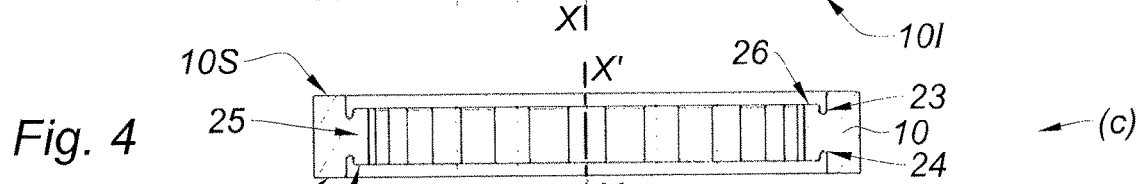
Fig. 4
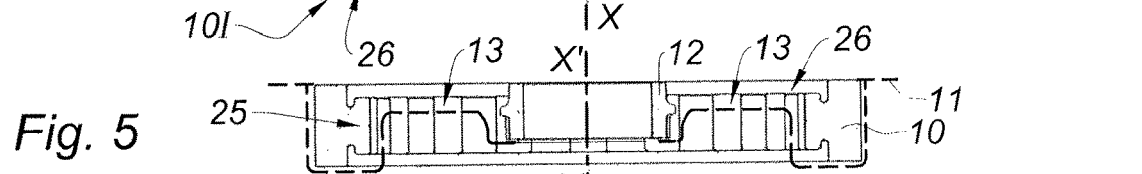
Fig. 5
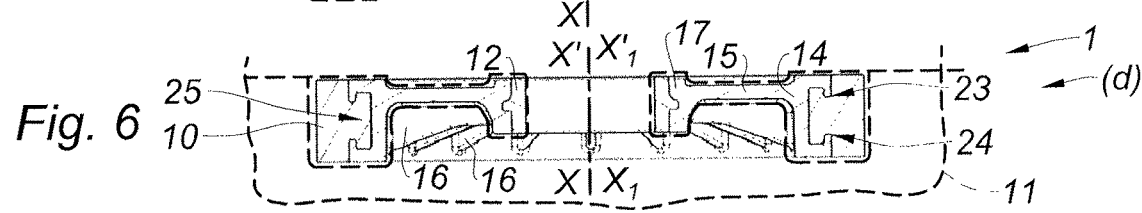
Fig. 6
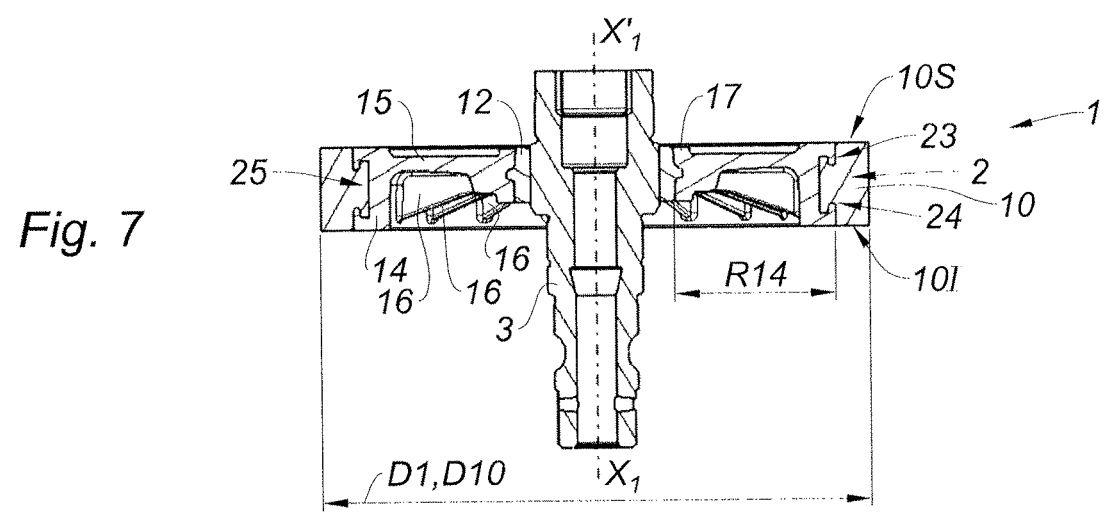
Fig. 7

METHOD FOR MANUFACTURING A TOOTHED WHEEL WITH A RIBBED CAST RIM

The present invention concerns the general field of manufacturing wheels intended to ensure the transmission of a torque within a mechanism, and more particularly the field of manufacturing toothed wheels destined for gear-type mechanisms.

More particularly, the present invention concerns the manufacture of toothed wheels destined for power steering reducers for motor vehicles.

Methods for manufacturing toothed wheels by overmolding operation are already known, methods during which an insert forming a hub is introduced in a mold, and then a rim made of a polymer material is produced around said hub by overmolding operation.

Nonetheless, such manufacturing methods may present some drawbacks.

In particular, during the overmolding operation, the polymer material may be subjected to shear and self-heating effects at its injection area, thereby causing severing of the polymer chains, so that the finally obtained rim may not present an optimal mechanical resistance, an in particular an optimal tenacity.

Afterwards, in particular in order to limit the aforementioned shear effects, the overmolding of the rim may require sprues with a particularly considerable volume, thereby resulting in an overconsumption of raw material and energy.

Furthermore, it may be difficult to achieve a satisfactory junction between the insert forming the hub and the rim obtained by overmolding operation, and in particular a junction that perfectly resists the torsional shear forces induced by the torque transmitted by the wheel.

As such, the creation, on the insert forming the hub, of attachment reliefs having complex shapes, intended to be covered by the material constitutive of the rim, may complicate the manufacture of said insert.

Finally, the use of a metallic hub having a large diameter, in order to support the rim, tends to increase the weight of the obtained wheel.

Consequently, the objects assigned to the invention aim to overcome the aforementioned drawbacks and to propose a new method for manufacturing a wheel, and in particular a toothed wheel, method which allows obtaining, in a simple, rapid and inexpensive manner, a wheel which is both light and particularly robust.

The objects assigned to the invention are achieved by means of a method for manufacturing a wheel comprising a tubular preform manufacturing step (a) which comprises casting a liquid to be polymerized in a first mold and polymerizing said liquid in said first mold so as to be solidified into a tubular preform, having a main axis (XX'), the first mold comprising a central core, which is centered on the main axis (XX') and which allows forming the central bore of the tubular preform, as well as modeling cores arranged substantially parallel to the main axis (XX') so as to form, in the radial thickness of the tubular preform, recesses which extend axially according to the length of said tubular preform, said method comprising afterwards a cutting step (b) which comprises cutting the tubular preform substantially perpendicularly to its main axis (XX'), and secant to the recesses, so as to obtain a tubular preform section forming a rim, and then an overmolding step (d) which comprises placing said rim in a second mold, concentrically with a central support member, such as a sleeve or a shaft, which materializes the axis of rotation ($X_1$, $X_1'$) of the wheel to be formed, and a polymer filling material is injected in the interstitial space which is radially comprised between said central support member and the rim, so that said filling material comes into contact with said central support member and penetrates the recesses of the rim, and therefore creates, when solidified, an intermediate disc which fastens the rim to the central support member.

Advantageously, the production of a tubular preform by casting operation, by introducing in the first mold the precursor(s) of the polymer material intended to constitute said preform (and therefore the rims derived from said preform), the polymer chains are created directly in the first mold, without mishandling them and, in particular, without subjecting them to considerable heating or to shear forces.

Hence, the tubular preform, and consequently the rims derived therefrom, are constituted by a long-chain polymer, with a preserved integrity, thereby giving them an excellent mechanical resistance, and in particular a good tenacity.

Hence, the robustness and the longevity of the wheel are enhanced.

Furthermore, the preparation of a tubular preform in one piece in which several rims may be cut up allows (pre) manufacturing said rims in series (in batches), in one casting operation, thereby allowing saving time and energy.

As such, insofar as it is possible to freely choose the length of the section to be cut, that is to say insofar as it is possible to freely choose the axial height of each rim derived from the preform, then a same tubular preform may be used to produce rims with different heights, which makes the method particularly versatile, though standardized for the manufacture by casting operation of the tubular preform.

Advantageously, the production of a plurality of recesses according to the invention, since the initial molding of the tubular preform at step (a), allows preforming directly on the rim, simply and rapidly, by means of modeling cores having a relatively simple shape and being easily removable from mold (and therefore by means of a first mold which is relatively simple to manufacture and to implement), attachment reliefs which will afterwards allow fastening said rim effectively on the wheel during the overmolding step (c), wherein said attachment reliefs will ensure in particular a good resistance to the torsion torques.

Thus, it is possible to combine the simplicity of the tooling with the mechanical effectiveness of the obtained shapes of the rim.

Moreover, the use of polymer materials, and more particularly thermoplastic polymer materials, to produce both the rim and the intermediate disc forming the spokes of the wheel, allows obtaining a particularly light wheel.

Furthermore, the use of a junction by an overmolded intermediate disc allows, if necessary, differentiating the first polymer material constitutive of the rim from the second polymer (filling) material constitutive of the intermediate disc, and therefore adapting the mechanical properties of the wheel depending on the intended use thereof.

Thus, it is possible for example to easily combine an intermediate disc forming a particularly rigid infrastructure, for example made of a composite material comprising a polymer matrix containing reinforcing fibers, such as glass fibers, carbon fibers, or aramid fibers, with a relatively (more) flexible rim, made for example of a non-fiber polymer material, so as to improve the quality of meshing and the distribution, within the wheel, of the forces transmitted by the mechanism to which said wheel is integrated.

Other objects, features and advantages of the invention will appear in more detail upon reading the description that follows, as well as with reference to the appended drawings, provided only for an illustrative and non-restrictive purpose, among which:

FIG. 1 illustrates, according to a perspective view, a tubular preform produced according to the invention.

FIG. 2 illustrates, according to a perspective view, a section cut in the preform of FIG. 1 and intended to form a rim.

FIG. 3 illustrates, according to an axial sectional view, the section of FIG. 2.

FIG. 4 illustrates, according to an axial sectional view, the circular grooving of the section of FIG. 2, allowing creating dovetail constricted attachment reliefs.

FIGS. 5 and 6 illustrate, according to axial sectional views, the placement of the rim in the second mold and the overmolding operation allowing forming the intermediate disc which links the rim to the central support member.

FIG. 7 illustrates, according to an axial sectional overview, an example of a wheel obtained by the method according to the invention, and more particularly an example of a subassembly obtained by press-fitting the wheel of FIG. 6 onto a shaft.

Figure 8:
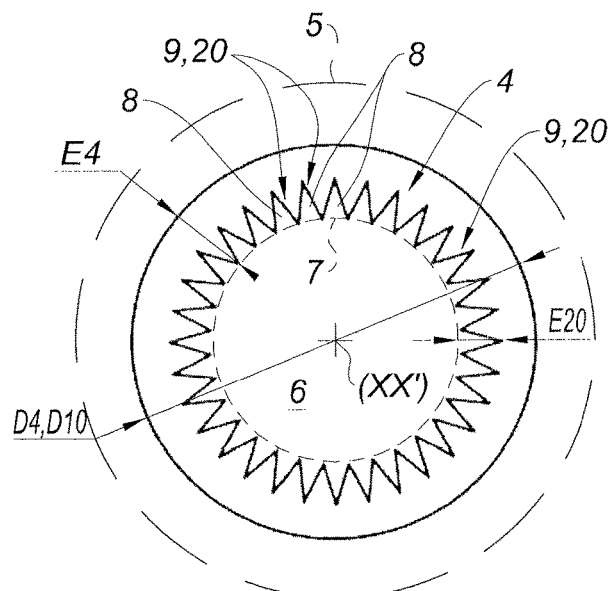
FIGS. 8 to 11 illustrate, according to sectional views transverse to the main axis (XX'), different variants of tubular preforms (and therefore of rims) according to the invention, presenting recesses of different types.
Figure 9:
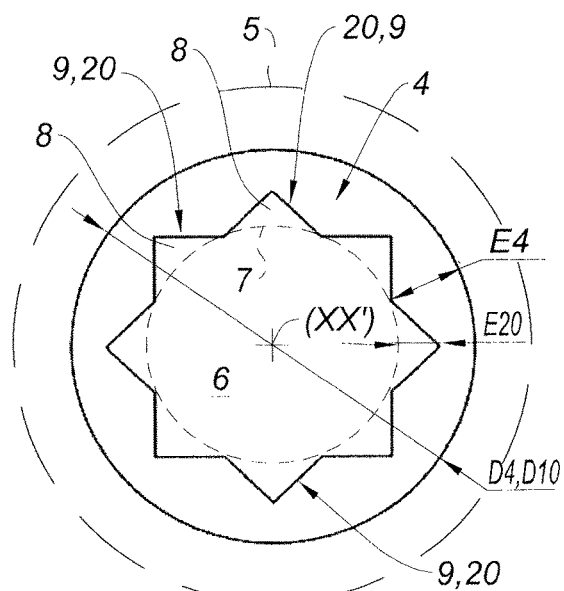

The present invention concerns a method for manufacturing a wheel 1, and more particularly a toothed wheel 1.

In particular, said toothed wheel 1 may be a gear reducer wheel, and more particularly, as illustrated in FIG. 7, a power steering reducer wheel.

As such, the wheel 1 may form for example a worm wheel intended to be driven by a worm screw.

The toothed wheel 1 may present any type of meshing teeth 2 (not detailed in the figures), forming for example spur teeth, helical teeth, or herringbone teeth.

As illustrated in FIG. 7, the wheel 1 will be advantageously fastened on a shaft 3, preferably a metallic shaft, which materializes the axis of rotation ($X_1$, $X_1'$) of said wheel.

Preferably, said shaft 3 will comprise, for example at one of the ends thereof, a pinion enabling it to engage another toothed part, such as a steering column or a rack.

Moreover, although the invention is not limited to a wheel 1 with particular dimensions, it will be noted that, within the framework in particular of a wheel 1 destined for a power steering reducer, the overall diameter D1 of said wheel 1 may be substantially comprised between 3 cm and 20 cm, more particularly between 5 cm and 15 cm, and preferably equal to 10 cm.

According to the invention, the method comprises a tubular preform 4 manufacturing step (a) which comprises casting a liquid to be polymerized in a first mold 5 and polymerizing said liquid in said first mold 5 so as to make said liquid be solidified into a tubular preform 4, with a main axis (XX'), as illustrated in FIG. 1.

Unlike the injection or extrusion molding methods, which re-melt an already constituted polymer but tend to deteriorate the chains therefrom, manufacturing the tubular preform 4 by casting operation according to the invention amounts to placing in the first mold 5, a bath containing the precursor(s) of the (first) polymer material constitutive of the tubular preform, so that the polymerization, that is to say the constitution of the polymer chains of said first material, takes place directly within the first mold 5, in particular without undergoing shear stresses.

Hence, the first polymer material, constitutive of the tubular preform 4, may be obtained by synthesizing large-sized and particularly resistant polymer chains.

As illustrated in FIGS. 1 and 8 to 11, the first mold 5 comprises a central core 6, which is centered on the main axis (XX') and which allows forming the central bore 7 of the tubular preform, as well as modeling cores 8 arranged substantially parallel to the main axis (XX') so as to form, in the radial thickness E4 of the tubular preform 4, recesses 9 which extend axially according to the length L4 of said tubular preform 4.

Advantageously, the method therefore allows forming directly, during the synthesis the polymer material constitutive of the tubular preform 4, the recesses 9 which will be used to reinforce the strength, in particular the torsional strength, of the rim on the hub of the wheel, the modeling cores 8 being used to reserve spaces corresponding to said recesses 9.

Thus, the large-sized polymer chains obtained by casting operation may be synthesized directly around (or upon contact with) the cores (the central core 6 and, especially, the modeling cores 8), so that said chains may conform to the shapes of said cores 6, 8 without being interrupted.

In this manner, the tubular preform 4, and consequently the rim 10 which will derive therefrom, will advantageously present a particularly robust structure, relatively homogeneous and barely subject to stress concentrations or to incipient breaks, including in the immediate vicinity of the recesses 9.

Preferably, the modeling cores 8 (and the central core 6) will be substantially rectilinear, but the draft angles, and aligned parallel to the main axis (XX'), in particular so as to enable an easy axial removal of the tubular preform 4 from the mold.

Furthermore, the modeling cores 8 (and the central core 6) will preferably extend over most of the length L4 of the tubular preform 4, and preferably over the entire length L4 of the tubular preform 4, so that the recesses 9, and more particularly each recess 9, pass(es) axially throughout the tubular preform 4, in a continuous manner.

On the one hand, such an arrangement simplifies the cores 6, 8 placing operations as well as the unmolding operation, and on the other hand, it makes the entire tubular preform 4 usable to form rims 10, without any loss of material (since it is possible to cut, in any area of the length of the preform 4, a section comprising all useful recesses 9).

According to the invention, the method comprises afterwards, after the tubular preform 4 manufacturing step (a), a cutting step (b), which comprises cutting the tubular preform 4, for example by sawing or by water-jet cutting, substantially perpendicularly to the main axis (XX') of said tubular preform, and secant to the recesses 9, as illustrated by a dashed line in FIG. 1, so as to obtain a tubular preform section forming a rim 10, as illustrated in FIGS. 1 to 3.

In other words, the tubular preform 4 will advantageously form a blank which may be cut in several annular slices, each being intended to form a rim 10.

As such, it will be noted that the length L4 of the tubular preform 4 advantageously allows obtaining at least two, at least three, at least five, or still at least ten or twenty rims 10, and for example between twenty and forty rims 10, from one and the same tubular preform 4.

To this end, the length L4 of the tubular preform 4 will be preferably greater, and for example two times to three times (or even four times) greater, than the overall diameter D4 of said preform 4 (which preferably corresponds substantially to the overall diameter D10 of the rim, and to the diameter D1 of the completed wheel 1).

As an indication, the length L4 of the raw preform 4 (usable, that is to say comprising recesses 9), may be substantially comprised between 20 cm and 50 cm, and for example about 40 cm, whereas the unitary (axial) height H10 of the rim 10 may be comprised between 10 mm and 20 mm (which, in the case of a 40-cm preform, will allow cutting respectively 20 to 40 rims 10).

Moreover, it will be advantageously noted that the operation of cutting the rim is likely to interrupt polymer chains only in the cutting planes, that is to say at the upper 10S and lower 10I edges of the rim 10 created by the cutting tool, and such that said cutting operation in no way affects the length of the polymer chains located deep in the mass of the rim 10 or on the other surfaces of the latter, and in particular the length of the polymer chains delimiting the contours of the recesses 9.

Hence, the obtained rim 10 is and remains particularly strong.

Afterwards, the method according to the invention comprises, as illustrated in FIGS. 5 and 6, an overmolding step (d) which comprises placing the rim 10 in a second mold 11 (FIG. 5), concentrically with a central support member 12, 3, such as a sleeve 12 or (directly) a shaft 3, which materializes the axis of rotation $(X_1, X_1')$ of the wheel 1 to be formed, and a polymer filling material is injected in the interstitial space 13, which is radially comprised between said central support member 12, 3 and the rim 10, so that said filling material comes into contact with said central support member 12, 3 and penetrates the recesses 9 of the rim 10, and therefore creates, when solidified, an intermediate disc 14 (FIGS. 6 and 7) which fastens the rim 10 to the central support member 12, 3.

Preferably, the (second) polymer material used as a filling material to form the intermediate disc 14 will be a thermoplastic polymer, enabling an overmolding operation by hot injection, at a temperature higher than the ambient temperature.

The use of an overmolding method will allow producing the intermediate disc 14 in a simple, rapid and reproducible manner, and preferably in one piece, while ensuring tight anchorage with the rim 10 and the central member 12, 3, in particular because, when in the fluid (liquid) state, the filling material easily penetrates the cavity of the recesses 9 and fills the latter.

Advantageously, the intermediate disc 14 will form both a hub and the spokes of the wheel 1.

To this end, the intermediate disc 14 may include, on the one hand, a substantially cylindrical hub 17 which wraps the central support member 12, 3 and, on the other hand, a collar 15, preferably solid, and preferably substantially normal to the axis of rotation $(X_1, X_1')$ of the wheel, which forms a bridge which links the radially outer surface of the central support member 12, 3, and more particularly the hub 17 (with which said collar 15 is integral), to the radially inner surface of the 10.

Thus, the collar 15 will materialize the equivalent of the spokes of the wheel 1.

Advantageously, the collar 15 may be reinforced by ribs 16, preferably orientated substantially radially, as illustrated in FIGS. 6 and 7.

As such, the collar 15 may preferably include reinforcing ribs 16 on the (axially) lower face thereof, or even exclusively on said lower face, as illustrated in FIG. 7.

Nonetheless, without departing from the scope of the invention, it is perfectly possible that the collar 15 includes reinforcing ribs 16 on the (axially) upper face thereof, or even on both the upper and lower faces thereof.

As an indication, in order to lighten the wheel 1 as much as possible, where appropriate by minimizing the volume of said wheel occupied by the metallic sleeve 12, the radial extent R14 of the intermediate disc 14 (which preferably corresponds to the radial extent of the interstitial space 13), considered between the main axis (XX') and the rim 10, will represent at least 20%, preferably at least 30, or even at least 40% 25%, and for example between 40% and 70% or even 80% of the radius D1/2 of the wheel 1.

For the same lightening purpose, the diameter of the central support member 12, 3 may, in turn, represent less than 50%, and for example between 20% and 35% of the diameter D1 of the wheel 1.

As indicated hereinabove, the central support member may be formed by a sleeve 12, preferably a metallic sleeve, which will advantageously be intended to be fitted onto a shaft 3, and fastened on said shaft, for example by press-fitting, as illustrated in FIGS. 5 to 7.

Nonetheless, according to a particularly advantageous variant, the central support member will be formed directly by the shaft 3, preferably metallic shaft, of the wheel 1, the overmolding step (d) then being performed directly on said shaft 3, so that the intermediate disc 14 comes into contact, and attaches directly to, the surface of said shaft 3. In order to visualize such variant, it would suffice to substitute the shaft 3 for the sleeve 12 in FIGS. 5 to 7.

Moreover, it will be noted that, in practice, the axis of rotation $(X_1, X_1')$ of the wheel 1 is coincident with the main axis (XX') of the rim 10, and therefore of the tubular preform 4, as shown in particular in FIG. 6.

For the sake of description, it is possible assimilate these two axes.

Furthermore, «axial», means a direction or a dimension considered along the main axis (XX'), respectively $(X_1, X_1')$, or parallel to the latter, and «radial», means a direction or a dimension considered transversely, and more particularly perpendicularly, to said main axis (XX'), $(X_1, X_1')$.

Preferably, the method includes a gear cutting step (e), subsequent to the overmolding step (d), which comprises cutting teeth 2 in the radial thickness of the rim 10 (herein corresponding to the radial thickness E4 of the tubular preform 4).

Advantageously, by cutting the meshing teeth a posteriori, after having finished molding the wheel 1, and while the effective axis of rotation $(X_1, X_1')$ of the wheel is already materialized by the sleeve 12, or preferably by the shaft 3, on which said wheel 1 is fastened, so that said sleeve 12, respectively said shaft 3, forms a reference for the cutting machine, it is possible to avoid any defect in circularity and concentricity between the pitch diameter of the teeth 2 obtained after cutting and said effective axis of rotation $(X_1, X_1')$.

According to a possible embodiment of the method, applicable in particular to the configurations of FIGS. 1, 8, 9 and 10, it is possible to use, during the tubular preform manufacturing step (a), modeling cores 8 which are formed in one piece with the central core 6, so that the corresponding recesses 9 are in the form of flutes 20 dug in the radially inner surface of the tubular preform 4, and which open radially onto the central bore 7 of said tubular preform 4.

Advantageously, this variant of implementation will simplify the casting tooling, thanks to the use of a single monolithic core which will combine the central core 6 and the integrated modeling cores 8, carried by said central core 6, wherein said modeling cores 8 will therefore form male cavities radially projecting above said central core 6.

The rim 10 obtained accordingly will present recesses 9 such as indentations, preferably evenly distributed in a star-like fashion about the main axis (XX'), and which will be used as torsional attachment reliefs.

Figure 10:
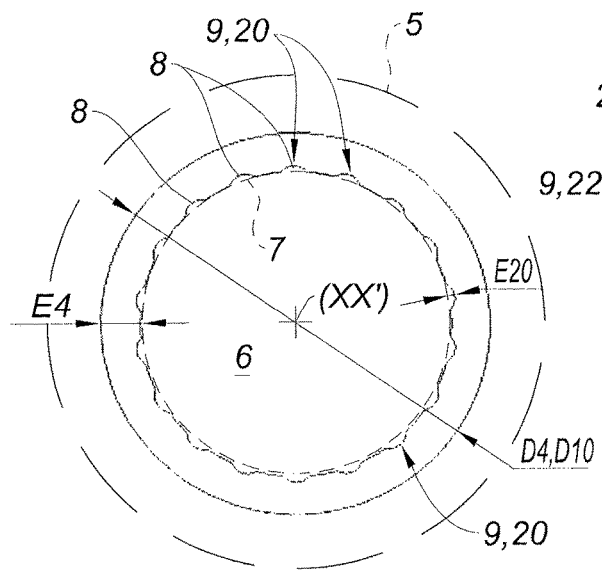

The penetration profile of the recesses 9, considered in a sectional plane normal to the main axis (XX'), may be in particular of a triangular «peak»-type (FIGS. 8 and 9), obtained by broken lines which meet at a ridge forming the deepest area in the thickness E4 of the rim 10, or of an «arch »-type, the bottom of each recess 9 being delimited by an incurved line forming a bowl (FIG. 10).

The radial depth of penetration E20 of the flutes 20 can be comprised between 0.5 mm and 3 mm and/or between 0.5% and 3% of the overall diameter D10 of the rim 10.

Indeed, such a sizing will allow obtaining an effective anchorage, resisting in particular the torsional forces, though without weakening the rim 10, and in particular the meshing teeth of said rim 10.

Figure 11:
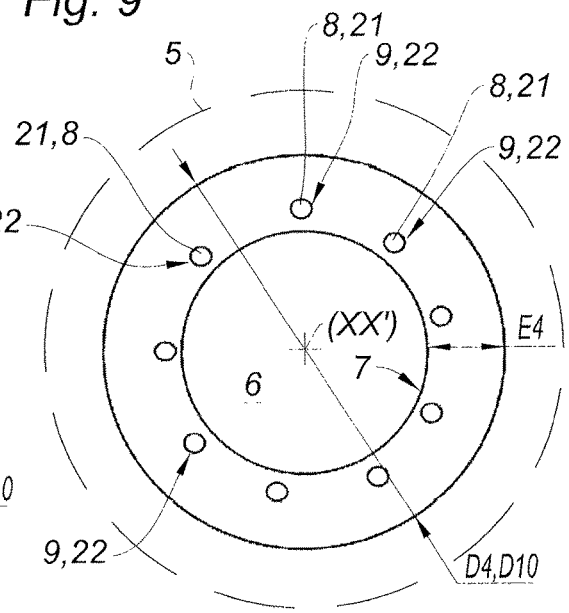

According to another possible implementation, which may be an alternative or a complement to the previous one (regarding the formation of flutes 20), it is possible to use, during the tubular preform 4 manufacturing step (a), modeling cores 8 which are formed by offset rods 21, distinct from the central core 6 and which extend parallel to the main axis (XX'), radially away from said central core 6, so that the corresponding recesses 9 are in the form of closed channels 22, integrated to the radial thickness E4 of the tubular preform 4, as illustrated in FIG. 11.

Thus, the recesses 9 are formed by cylindrical passages, preferably having a circular base, such as through holes, pierced in an offset manner from the central bore 7 (herein, along a distribution circle with a diameter larger than the diameter of the bore 7), so that said channels 22 are radially separated from said bore 7 by a portion of the radial thickness E4 of the tubular preform 4 (and therefore of the rim 10).

In particular, besides reinforcing the torsional attachment, such a configuration will also allow reinforcing the axial anchorage of the rim 10 on the intermediate disc 14.

Preferably, the method comprises, after the cutting step (b) and before the overmolding step (d), a circular grooving step (c) which comprises producing a circular groove 23, respectively 24, centered on the main axis (XX') and secant to the recesses 9, on the axially upper edge 10S and/or on the axially lower edge 10I of the rim 10, as illustrated in FIG. 4.

Advantageously, digging the circular groove(s) 23, 24 may be carried out in a simple and rapid manner by material removal, according to an axial penetration movement, by means of a cutting tool, such as a milling cutter or a circle cutter (hole-saw) with a suitable diameter.

Advantageously, the circular groove(s) 23, 24 will complete and improve the initial shape of the recesses 9 so as to confer a radial attachment capability to the latter.

More particularly, each circular groove 23, 24 will preferably link the different recesses 9 together, thereby forming a circular communication channel (making said recesses communicate together), dug in the axial height H10 of the rim, centered on the main axis (XX'), and radially located beyond the limit of the inner bore 7.

In this manner, filling of said circular groove 23, 24 by the (second) filling material, during the overmolding step (d), will allow creating, as illustrated in FIGS. 6 and 7, on the one hand, an anchorage crown conferring a circling effect, and therefore, at the same time, a radial retaining effect of the rim 10 on the intermediate disc 14 and, on the other hand, an underlying stiffening effect of the rim 10, as well as a stiffening effect of the linkage between said rim 10 and the radially outer edge of said intermediate disc 14.

In other words, the circular groove(s) 23, 24 is (are) preferably contained radially beyond the radially inner limit of the rim 10 (the limit of the inner bore 7), so as to form, in the rim 10, in the cross-section containing the main axis (XX'), constricted attachment reliefs 25, such as dovetails, which improve the radial anchorage of the intermediate disc 14 to the rim 10 (and vice versa), as shown in particular in FIGS. 4 to 7.

Indeed, the grooves 23, 24 define a neck-like constriction in the rim 10, which is axially narrower than the radially inner «head» of said rim 10 which delimits the inner bore 7, which allows the intermediate disc 14 to act as a jaw (herein «C» shaped jaw) for retaining the rim 10.

In the end, the invention allows creating, in few and relatively simple and rapid operations, dual attachment reliefs allowing, on the one hand, a torsional anchorage (in rotation) thanks to the penetration of the recesses 9 beyond the radially inner envelope of the inner bore 7 and, on the other hand, a radial (in particular centrifugal) anchorage thanks to the circling grooves 23, 24 (possibly in addition to the radial anchorage which may be already established in a configuration according to which the filling material passes in the closed channels 22, and therefore exerts a radial retaining force against the residual thickness of the rim 10 comprised between the inner bore 7 and said closed channels 22).

Moreover, it will be noted that, in order to facilitate the access of the filling material to the circular grooves 23, 24 and, where appropriate, in order to form the intermediate disc 24 in a space contained axially along the axial height H10 of the rim 10 in order to obtain a compact wheel 1 (the intermediate disc 14 may for example be flush with the upper 10S and lower 10I edges of the rim, as illustrated in FIGS. 6 and 7), the grooving step (c) may be accompanied by the production of a counterbore 26 allowing digging a depression axially from the edge 10S, 10I of the rim 10, as shown in FIGS. 4 and 5.

Preferably, the (first) material constitutive of the tubular preform 4, and therefore of the rim 10, will be a polyamide, preferably polyamide 6.

Indeed, such a material combines a mechanical and chemical resistance (in particular against lubricants) with some flexibility which will be useful to the quality of meshing of the teeth 2 with the rest of the mechanism to which the wheel 1 is integrated.

Of course, the invention is in no way limited to the sole variants described in the foregoing, those skilled in the art being in particular capable of freely isolating or combining together either one of the aforementioned features, or substituting them with equivalents.

Of course, the invention further concerns, as such, a wheel 1, and in particular a gear reducer wheel, obtained according to the method described hereinabove.

The invention claimed is:

1. A method for manufacturing a wheel comprising a tubular preform manufacturing step (a), which comprises casting a liquid to be polymerized in a first mold and polymerizing said liquid in said first mold so as to be solidified into a tubular preform, with a main axis, the first mold comprising a central core, which is centered on the main axis and which allows forming the central bore of the tubular preform, as well as modeling cores arranged substantially parallel to the main axis so as to form, in the radial thickness of the tubular preform, recesses that extend axially according to the length of said tubular preform, said method comprising afterwards a cutting step (b), which comprises cutting the tubular preform substantially perpendicularly to the main axis thereof, and secant to the recesses, so as to obtain a tubular preform section forming a rim, and then an overmolding step (d) that comprises placing said rim in a second mold, concentrically with a central support member, which materializes the axis of rotation of the wheel to be formed, and a polymer filling material is injected in the interstitial space which is comprised radially between said central support member and the rim so that said filling material come into contact with said central support member and penetrates the recesses of the rim, and therefore creates, when solidified, an intermediate disc which fastens the rim to the central support member, wherein the central core is reusable and part of the mold.

2. The method according to claim 1, wherein, during the tubular preform manufacturing step (a), modeling cores, which are formed in one piece with the central core, are used so that the corresponding recesses are in the form of flutes dug in the radially inner surface of the tubular preform, and which open radially onto the central bore of said tubular preform.

3. The method according to claim 2, wherein the radial depth of penetration of the flutes is comprised between 0.5 mm and 3 mm and/or between 0.5% and 3% of the overall diameter of the rim.

4. The method according to claim 1, wherein, during the tubular preform manufacturing step (a), modeling cores are used, which modeling cores are formed by offset rods, distinct from the central core and which extend parallel to the main axis, radially away from said central core, so that the corresponding recesses are in the form of closed channels, integrated to the radial thickness of the tubular preform.

5. The method according to claim 1, wherein, after the cutting step (b) and before the overmolding step (d), a circular grooving step which comprises producing a circular groove centered on the main axis and secant to the recesses, on the axially upper edge and/or on the axially lower edge of the rim.

6. The method according to claim 5, wherein the circular groove(s) is (are) contained radially beyond the inner radial limit of the rim, so as to form, in the rim, in the cross-section containing the main axis, constricted attachment reliefs, improving the radial anchorage of the intermediate disc to the rim.

7. The method according to claim 1, wherein the method includes a gear cutting step (e), subsequent to the overmolding step (d), which comprises cutting meshing teeth in the radial thickness of the rim.

8. The method according to claim 1, wherein the material constitutive of the tubular preform is a polyamide.

* * * * *